United States Patent
Knutson et al.

(10) Patent No.: US 8,665,561 B1
(45) Date of Patent: Mar. 4, 2014

(54) METHOD AND SYSTEM FOR PROVIDING ENHANCED THERMAL EXPANSION FOR HARD DISK DRIVES

(71) Applicant: Western Digital (Fremont), LLC, Fremont, CA (US)

(72) Inventors: Neil D. Knutson, Fremont, CA (US); Yu Lo, Foster City, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/928,189

(22) Filed: Jun. 26, 2013

Related U.S. Application Data

(62) Division of application No. 13/332,241, filed on Dec. 20, 2011.

(51) Int. Cl.
*G11B 5/127* (2006.01)

(52) U.S. Cl.
USPC .................................................... 360/125.3

(58) Field of Classification Search
USPC ............. 360/125.31, 123.01, 122, 125.14, 360/125.74, 125.3, 123.03, 234.5, 245.3, 360/234.4, 324.1, 245.5, 125.06
See application file for complete search history.

(56) References Cited

U.S. PATENT DOCUMENTS

| | | | |
|---|---|---|---|
| 6,661,605 B1* | 12/2003 | Pust et al. | 360/125.71 |
| 6,972,919 B2* | 12/2005 | Suk | 360/75 |
| 7,397,625 B2* | 7/2008 | Lille | 360/75 |
| 7,593,183 B2* | 9/2009 | Hsiao et al. | 360/123.09 |
| 2005/0046995 A1* | 3/2005 | Lille | 360/78.04 |
| 2005/0052773 A1* | 3/2005 | Suk | 360/75 |
| 2006/0028754 A1* | 2/2006 | Suk | 360/75 |
| 2007/0247750 A1* | 10/2007 | Hsiao et al. | 360/126 |
| 2009/0103208 A1* | 4/2009 | Aoki et al. | 360/110 |
| 2009/0279207 A1* | 11/2009 | Sasaki et al. | 360/125.03 |

* cited by examiner

*Primary Examiner* — Allen T Cao

(57) ABSTRACT

A method and system provide a magnetic read and/or write transducer for use in disk drive. A read transducer has an air-bearing surface (ABS) and includes a read sensor, a nonmagnetic gap, a heater, and an expander. The nonmagnetic gap is adjacent to a portion of the read sensor and has a first coefficient of thermal expansion (CTE). The heater heats a portion of the magnetic read transducer. The expander is adjacent to a portion of the nonmagnetic gap and has a second CTE greater than the first CTE. The write transducer includes a pole, a coil, an insulator adjacent to and for insulating the coil, a heater and an expander. The expander has a CTE greater than the insulator's CTE.

15 Claims, 5 Drawing Sheets

METHOD AND SYSTEM FOR PROVIDING ENHANCED THERMAL EXPANSION FOR HARD DISK DRIVES

CROSS-REFERENCE TO RELATED APPLICATIONS

This application is a divisional of U.S. patent application Ser. No. 13/332,241, filed on Dec. 20, 2011, which is hereby incorporated by reference in its entirety.

BACKGROUND

Disk drives typically use heads residing on sliders to read from and write to the magnetic media. Read and write transducers residing in the head are flown at a small, controlled spacing above the magnetic medium during read and write operations. Thermal actuators, or heaters, may be used to control the spacing between the media and the read or write transducer. More specifically, heat generated by the heater causes local thermal expansion of the head. The thermal expansion results in protrusions of the head near the air-bearing surface (ABS). Protrusions in portions of the head near the ABS locally reduce the spacing between the head and magnetic media. The heater can be driven to induce sufficient heating for contact between the head and media. Such an operation is known as touchdown. This touchdown is intentional and is generally performed on each drive during initial drive calibration. The heater may also be used to otherwise control the spacing between the head and media.

Although heaters can be used to control the protrusion of the head, there may be drawbacks. A heater is typically included in the write transducer, but may not be in the read transducer of a head. Consequently, there are offsets between the protrusion of the write transducer and the protrusion of the read transducer.

Portions of the read transducer may not have a sufficient protrusion to obtain the desired spacing between the read transducer and media (including touchdown). Further, even if the read transducer may protrude a sufficient amount, this may not be possible without inducing a protrusion in the write transducer that is larger than desired. Although multiple heaters may be included in a head, back end processing of the heat may be subject to significant variations. As a result, the heater in the read or write transducer may not be able lo generate sufficient heat to provide Ihe desired protrusion of the head.

Accordingly, what is needed is a system and method for providing improved touchdown detection.

BRIEF SUMMARY OF THE INVENTION

A method and system provide a magnetic read and/or write transducer for use in disk drive. A read transducer has an air-bearing surface (ABS) and includes a read sensor, a nonmagnetic gap, a heater, and an expander. The nonmagnetic gap is adjacent to a portion of the read sensor and has a first coefficient of thermal expansion (CTE). The heater heats a portion of the magnetic read transducer. The expander is adjacent to a portion of the nonmagnetic gap and has a second CTE greater than the first CTE. The write transducer includes a pole, a coil, an insulator adjacent to and for insulating the coil, a heater and an expander. The expander has a CTE greater than the insulator's CTE

DETAILED DESCRIPTION OF THE PREFERRED EMBODIMENTS

Figure 1:
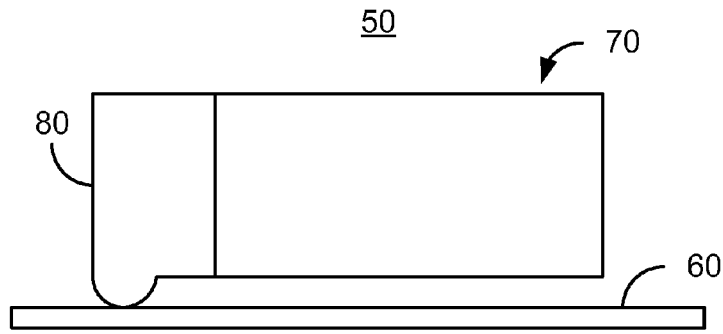
FIG. 1 is a diagram of a portion of an exemplary embodiment of a disk drive including at least one heater.

FIG. 1 is a diagram of a portion of an exemplary embodiment of a disk drive 50, which may employ one or more heaters. For simplicity, components are omitted. In addition, for clarity, FIG. 1 is not drawn to scale. The disk drive 50 includes a media 60 and a slider 70. On the slider 70 resides head 80, which includes a read transducer and/or a write transducer (not labeled) as well as at least one heater (not explicitly shown). The disk drive 50 is shown at touchdown. Consequently, the head 80 contacts the media 60 in the region that protrudes due to heater(s) (not shown). Thus, in the embodiment shown, the heater(s) in the disk drive may generate enough heat that the read transducer and/or write transducer may be controlled to have the desired spacing with the media. This includes allowing for touchdown when desired.

Figure 2:
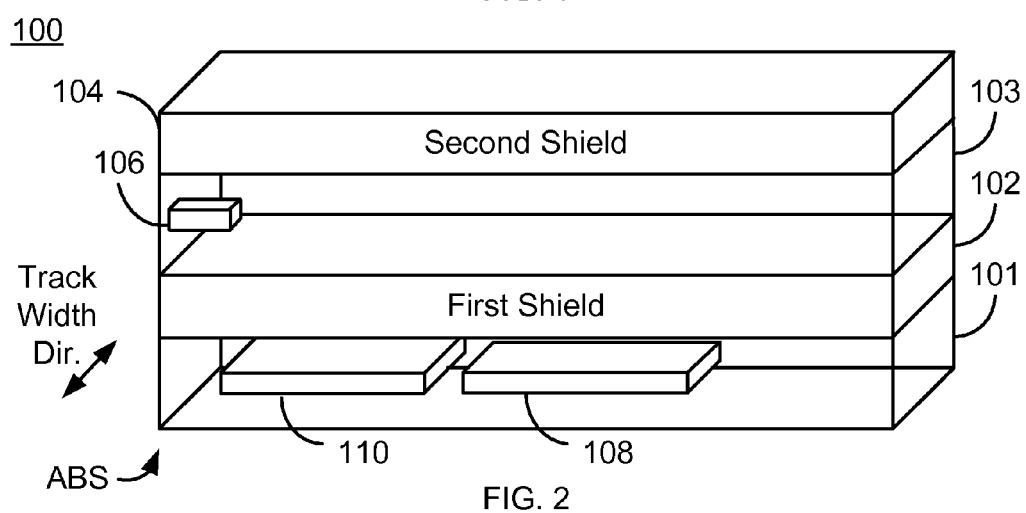
FIG. 2 depicts a perspective view of an exemplary embodiment of a read transducer including an expander.

FIG. 2 depicts an exemplary embodiment of a portion of the magnetic head 80. More specifically, a read transducer 100 is shown in FIG. 2. For simplicity, any other components of the head 80 are omitted and the media 60 is not shown in FIG. 2. For clarity, FIG. 2 is not drawn to scale. Referring to FIGS. 1-2, the read transducer 100 is also described in the context of particular components and layers. However, in some embodiments, such layers may include sub-layer(s). In addition, some components may be moved, omitted, or combined with other components.

The read transducer 100 is used in reading from the media 60. The read transducer 100 includes shields 102 and 104, insulators 101 and 103, read sensor 106, heater 108 and expander 110. The read sensor 106 may include a giant magnetoresistive sensor, such as a tunneling magnetoresistive junction. However, in other embodiments, the read sensor 106 may include other and/or additional components. In addition, other components such as magnetic bias structures, side shields, contacts and other structures are not shown.

In the embodiment shown, the shield 102 is shown between the heater 108 and the sensor 106. Thus, the heater 108 and expander 110 reside in an insulating layer 101 that, for the purposes of the embodiment shown, is considered part of the read transducer 100. Thus, the insulating layer 101 is considered adjacent to (near) the read sensor 106. However, in other embodiments, the heater 108 and/or the expander 110 may be located elsewhere. Although the heater 108 and expander 110 are shown at particular locations in FIGS. 1 and 2, in other embodiments, these components 108 and 110 may be located elsewhere. The heater 108 is used to generate heat, which causes a local protrusion of the read transducer 100. Thus, the heater 108 may be used to induce the protrusion causing touchdown, as shown in FIG. 1, and otherwise control the spacing of the head 80 to the media 60.

The expander 110 is proximate to the heater 108. The expander 110 is desired to be nonmagnetic. In the embodiment shown, the expander 110 is between the heater 108 and the ABS. However, in other embodiments, at least a portion of the expander overlaps the heater 108. In the embodiment shown, the expander 110 is recessed from the ABS. Thus, any issues due to corrosion may be mitigated or avoided. However, in other embodiments, the expander 110 may extend to the ABS. The coefficient of thermal expansion (CTE) of the expander 110 is larger than the CTE of the insulator 101 surrounding the expander 110. Thus, the expander 110 increases in size to a greater degree than the surrounding insulator 101 for the same temperature change. The CTE of the expander 110 may be at least twice the CTE of the insulator 101. In some embodiments, the CTE of the expander 110 is at least three times the CTE of the insulator 101. In some embodiments, the expander 110 may be a metal, such as copper having a CTE on the order of $16.5 \times 10^{-6}$/K. Other materials including nonmetals may be used. However, metals may be preferred to improve the response time of the expander 110.

The expander 110 is configured to improve the ability of the heater 108 to cause a protrusion of the read transducer 100 at the ABS. Thus, the CTE of the expander 110 is greater than the surrounding insulator 101. In addition, the geometry of the expander 110 may be configured such that the change in size of the expander 110 due to heating by the heater 108 may be directional in nature. Thus, the expander 110 may be made relatively thin in the down track direction (vertically in FIG. 2) and may have a length perpendicular to the ABS that is at least twice the width in the track width direction. Thus, the aspect ratio of the expander 110 may be at least two. In some embodiments, the aspect ratio of the expander 110 is at least five. The higher aspect ratio translates to a preferred direction of expansion: perpendicular to the ABS. Further, the expander 110 may be configured to overlap the active portion of the heater 108 in the track width direction. Thus, the width of the expander 110 in the track width direction may be at least as large as the width of the active portion of the heater 108 in the track width direction. Further, as viewed from the ABS, the expander 110 may be directly in front of, directly above, or directly below the active portion of the heater 108. Thus, the expander 110 tends to overlap the active region of the heater in the track width direction.

In operation, current is driven through the heater 108, which generates heat. In response, both the insulator 101 and the expander 110 experience an increase in temperature. Because they each have a nonzero CTE, the insulator 101 and expander 110 also change in size. However, because the expander 110 has a CTE that is greater than that of the insulator 101, the expander 110 protrudes to a greater degree than the insulator 101. In some embodiments, this difference is significant—two to three times or more. Further, the expander 110 may have a length perpendicular to the ABS that is greater than the remaining dimensions. Thus, the expander 110 tends to expand perpendicular to the ABS to a larger degree. The increase in thermal expansion, particularly coupled with the directionality of the thermal expansion, tends to cause the insulator 101, the shield 102, and other nearby components of the transducer 100 to protrude out toward the ABS. Thus, the expander 110 may enhance the thermally induced protrusion of the read transducer 100. The desired protrusion of the transducer 100 may thus be achieved at a lower temperature, a greater protrusion may be achieved at the same temperature, and/or the desired protrusion may be attained despite variations in fabrication of the transducer 100. In addition, because the expander 110 can provide the desired protrusion at lower temperatures, the heater 108 may be moved further from the sensor 106. For example, the heater 108 may be placed further from ABS. Thus, the sensor 106 may be better protected from damage.

Figure 3:
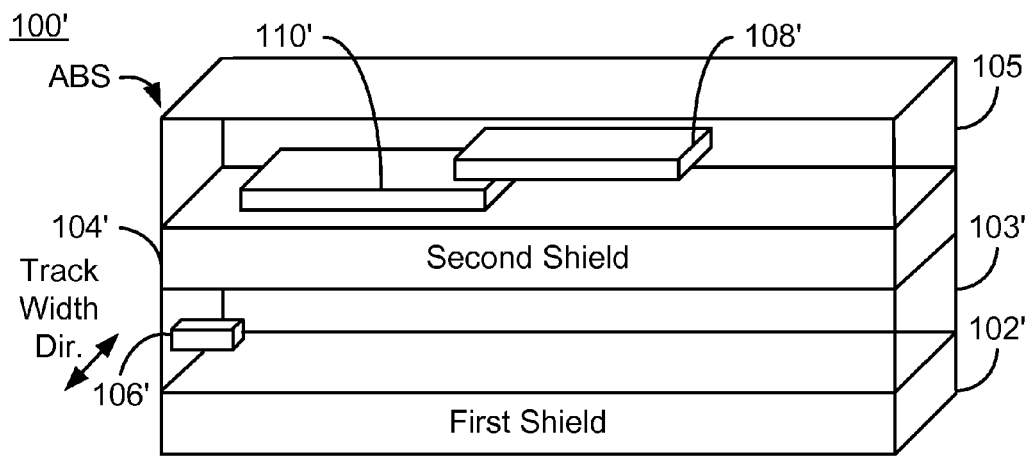
FIG. 3 depicts a perspective view of another exemplary embodiment of a read transducer including an expander.

FIG. 3 depicts a perspective view of an exemplary embodiment of a portion of the magnetic head 80. More specifically, a read transducer 100' is shown in FIG. 3. For simplicity, any other components of the head 80 are omitted and the media 60 is not shown in FIG. 3. For clarity, FIG. 3 is not drawn to scale. Referring to FIGS. 1 and 3, the read transducer 100' is also described in the context of particular components and layers. However, in some embodiments, such layers may include sub-layer(s). In addition, some components may be moved, omitted, or combined with other components. The transducer 100' is analogous to the transducer 100. Consequently, analogous components are labeled similarly. The transducer 100' thus includes shields 102' and 104', insulators 101' and 103', read sensor 106', heater 108' and expander 110' that are analogous to shields 102 and 104, insulators 101 and 103, read sensor 106, heater 108, and expander 110, respectively. The components 101', 102', 103', 104', 106', 108', and 110' thus have a similar structure and function to the components 101, 102, 103, 104, 106, 108, and 110, respectively. Also shown is insulator 105.

In the embodiment shown, the second shield 104' is between the read sensor 106' and the expander 110' and heater 108'. Thus, the heater 108' and expander 110' reside in the insulator 105 that may be between the read transducer and a write transducer (not shown in FIG. 3). Further, a portion of the expander 110' overlaps the heater 108'.

The heater 108' and expander 110' function in an analogous manner to the heater 108 and expander 110. Thus, a current is driven through the heater 108', which generates heat. In response, both the insulator 105 and the expander 110' experience an increase in temperature. Because it has a larger CTE, the expander 110' changes size to a greater extent than the insulator 105. Further, the expander 110' may have a length perpendicular to the ABS that is greater than the remaining dimensions. Thus, the expander 110' tends to expand perpendicular to the ABS to a larger extent. The increase in thermal expansion, particularly coupled with the directionality of the thermal expansion, tends to cause the insulator 105, the shields 102' and 104', and other nearby components of the transducer 100' to protrude out toward the ABS. In addition, because the expander 110' can provide the desired protrusion at lower temperatures, the heater 108' may be moved further from the sensor 106'. For example, the heater 108' may be placed further from ABS. Thus, the sensor 106' may be better protected from damage.

Thus, the transducer 100' may share the benefits of the transducer 100. Because of the expander 110' the thermally induced protrusion of the read transducer 100' may be enhanced. The desired protrusion of the transducer 100' may thus be achieved at a lower temperature, a greater protrusion may be achieved at the same temperature, and/or the desired protrusion may be attained despite variations in fabrication of the transducer 100'.

Figure 4:
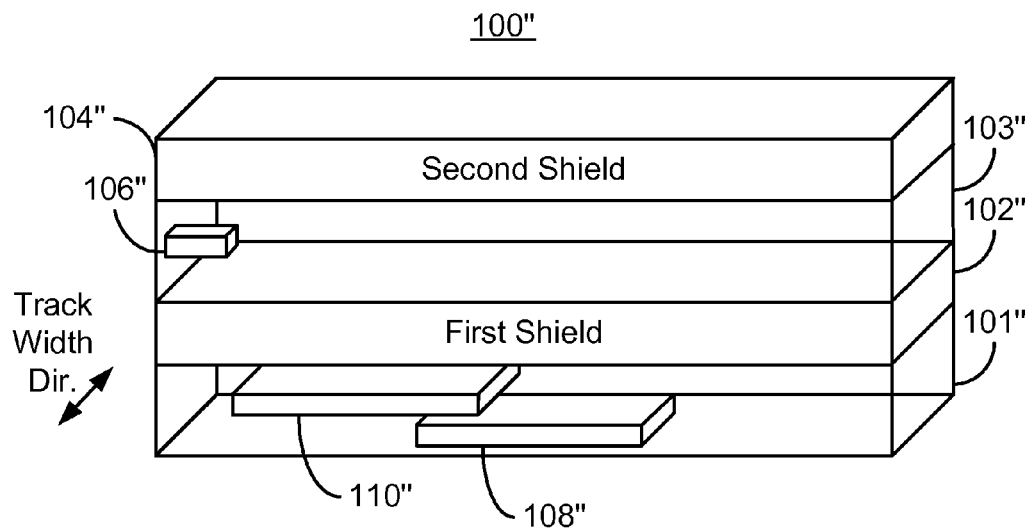
FIG. 4 depicts a perspective view of another exemplary embodiment of a read transducer including an expander.

FIG. 4 depicts a perspective view of an exemplary embodiment of a portion of the magnetic head 80. More specifically, a read transducer 100" is shown in FIG. 4. For simplicity, any other components of the head 80 are omitted and the media 60 is not shown in FIG. 4. For clarity, FIG. 4 is not drawn to scale. Referring to FIGS. 1 and 4, the read transducer 100" is also described in the context of particular components and layers.

However, in some embodiments, such layers may include sub-layer(s). In addition, some components may be moved, omitted, or combined with other components. The transducer 100" is analogous to the transducers 100 and 100'. Consequently, analogous components are labeled similarly. The transducer 100" thus includes shields 102" and 104", insulators 101" and 103", read sensor 106", heater 108" and expander 110" that are analogous to shields 102/102' and 104/104', insulators 101/101' and 103/103', read sensor 106/106', heater 108/108', and expander 110/110', respectively. The components 101", 102", 103", 104", 106", 108", and 110" thus have a similar structure and function to the components 101/101', 102/102', 103/103', 104/104', 106/106', 108/108', and 110/110', respectively.

In the embodiment shown, the expander 110" and heater 108" are close to the shield 102". Thus, the heater 108" and expander 110" again reside in the insulator 101" that also adjoins the shield 102". However, in this embodiment, a portion of the expander 110" overlaps the heater 108" in both the track width direction (as seen from the ABS) and perpendicular to the ABS.

The heater 108" and expander 110" function in an analogous manner to the heater 108/108' and expander 110/110'. Thus, a current is driven through the heater 108", which generates heat. In response, both the insulator 101" and the expander 110" experience an increase in temperature. Because it has a larger CTE, the expander 110" changes size to a greater extent than the insulator 101". Further, the expander 110" may have a length perpendicular to the ABS that is greater than the remaining dimensions. Thus, the expander 110" tends to expand perpendicular to the ABS to a greater degree. The increase in thermal expansion, particularly coupled with the directionality of the thermal expansion, tends to cause the insulator 101", the shields 102" and 104", and other nearby components of the transducer 100" to protrude out toward the ABS.

Thus, the transducer 100" may share the benefits of the transducers 100 and 100'. Because of the expander 110" the thermally induced protrusion of the read transducer 100" may be enhanced. The desired protrusion of the transducer 100" may thus be achieved at a lower temperature, a greater protrusion may be achieved at the same temperature, and/or the desired protrusion may be attained despite variations in fabrication of the transducer 100". Further, in this embodiment, a portion of the expander 110" overlaps the heater 108" in both the track width direction (as seen from the ABS) and perpendicular to the ABS. Thus, in addition to the benefits of the transducer 100, the efficiency of heat transfer between the heater 108" and the expander 110" may be improved. In addition, because the expander 110" can provide the desired protrusion at lower temperatures, the heater 108" may be placed further from the sensor 106". Thus, the sensor 106" may be better protected from damage.

Figure 5:
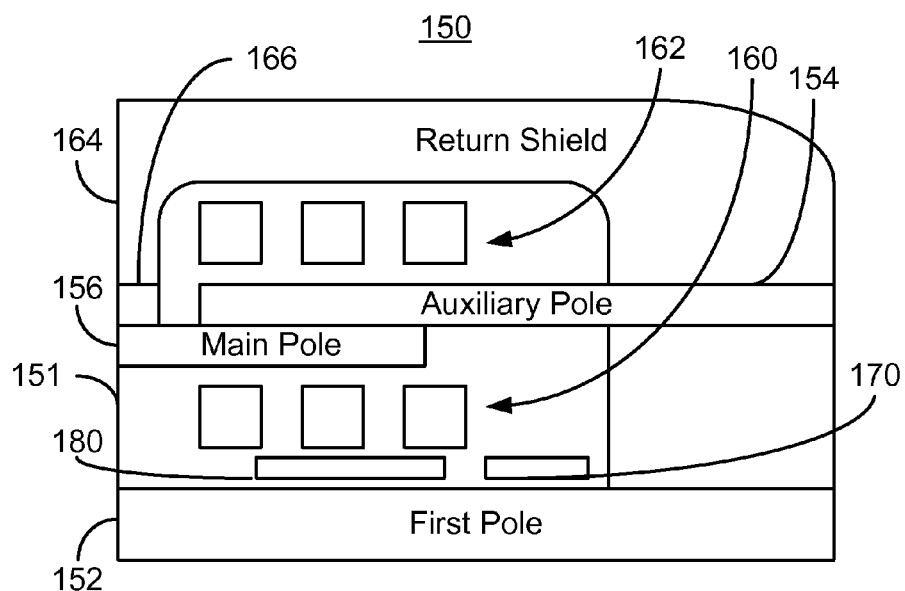
FIG. 5 depicts a side view of an exemplary embodiment of a write transducer including an expander.

FIG. 5 depicts an exemplary embodiment of a portion of the magnetic head 80. More specifically, a write transducer 150 is shown in FIG. 5. For simplicity, any other components of the head 80 are omitted and the media 60 is not shown in FIG. 5. For clarity, FIG. 5 is not drawn to scale. Referring to FIGS. 1 and 5, the write transducer 150 is also described in the context of particular components and layers. However, in some embodiments, such layers may include sub-layer(s). In addition, some components may be moved, omitted, or combined with other components.

The write transducer 150 is used in writing to the media 60. The write transducer 150 is shown as including a first pole 152, auxiliary pole 154, main pole 156, write gap 166, coils 160 and 162, return shield 164, heater 170 and expander 180. However, in another embodiment, the write transducer 150 may include other and/or different components. For example, in other embodiments, the write transducer 150 may be an energy assisted magnetic recording (EAMR) transducer including optics for directing light energy toward a media for heating. In addition, one or more portions of the write transducer 150 might be omitted in various embodiments.

The heater 170 and expander 180 reside in an insulating layer 151 that insulates the turns of the coil 160. However, in other embodiments, the heater 170 and/or the expander 180 may be located elsewhere. For example, the heater 170 and/or expander 180 might reside in the insulator adjoining the other coil 162, on the other side of the pole 154. Although the heater 170 and expander 180 are shown at particular locations in FIGS. 1 and 5, in other embodiments, these components 170 and 180 may be located elsewhere.

The heater 170 and expander 180 are analogous to the heater 108/108'/108" and expander 110/110'/110". Thus, the heater 170 is used to generate heat, which causes a local protrusion of the write transducer 150. The expander 180 is proximate to the heater 170. The expander 180 is desired to be nonmagnetic to prevent interference with operation of the write transducer 150. In the embodiment shown, the expander 180 is between the heater 170 and the ABS. However, in other embodiments, at least a portion of the expander overlaps the heater 170. In the embodiment shown, the expander 180 is recessed from the ABS. Thus, any issues due to corrosion may be mitigated or avoided. However, in other embodiments, the expander 180 may extend to the ABS. The CTE of the expander 180 is larger than the CTE of the insulator 151 surrounding the expander 180. Thus, the expander 180 increases in size to a greater degree than the surrounding insulator 151 for the same temperature change. The CTE of the expander 180 may be at least twice the CTE of the insulator 151. In some embodiments, the CTE of the expander 180 is at least three times the CTE of the insulator 151. In some embodiments, the expander 180 may be a metal, such as copper having a CTE on the order of $16.5 \times 10^{-6}$/K. Other materials including nonmetals may be used. However, metals may be preferred to improve the response time of the expander 180.

The expander 180 is configured to improve the ability of the heater 170 to cause a protrusion of the write transducer 150 at the ABS. Thus, the CTE of the expander 180 is greater than the surrounding insulator 151. In addition, the geometry of the expander 180 may be configured such that the change in size of the expander 180 due to heating by the heater 170 may be directional in nature. Thus, the expander 180 may be made relatively thin in the down track direction (vertically in FIG. 5). The expander 180 may have a length perpendicular to the ABS that is at least twice the width in the track width direction (perpendicular to the plane of the page in FIG. 5). Thus, the aspect ratio of the expander 180 may be at least two. In some embodiments, the aspect ratio of the expander 180 is at least five. The higher aspect ratio translates to a preferred direction of expansion: perpendicular to the ABS. Further, the expander 180 may be configured to overlap the active portion of the heater 170 in the track width direction. Thus, the width of the expander 180 in the track width direction may be at least as large as the width of the active portion of the heater 170 in the track width direction. Further, as viewed from the ABS, the expander 180 may be directly in front of, directly above, or directly below the active portion of the heater 170. Thus, the expander 180 tends to overlap the active region of the heater in the track width direction. Thus, the expander 180 and heater 170 may be configured in an analogous manner to the expander 110/110'/110" and heater 108/108'/108" depicted in FIGS. 2-4.

In operation, the heater 170 generates heat. Both the insulator 151 and the expander 180 experience an increase in temperature and, therefore, size. However, because the expander 180 has a CTE that is greater than that of the insulator 151, the expander 180 protrudes to a greater degree than the insulator 151. Further, the expander 180 may have a length perpendicular to the ABS that is greater than the remaining dimensions. Thus, the change in length of the expander 180 is preferentially in the direction perpendicular to the ABS. The increase in thermal expansion, particularly coupled with the directionality of the thermal expansion, tends to cause the insulator 151, the pole 156, and other nearby components of the transducer 150 to protrude out toward the ABS. Thus, the expander 180 may enhance the thermally induced protrusion of the write transducer 150. The desired protrusion of the transducer 150 may thus be achieved at a lower temperature, a greater protrusion may be achieved at the same temperature, and/or the desired protrusion may be attained despite variations in fabrication of the transducer 150.

Figure 6:
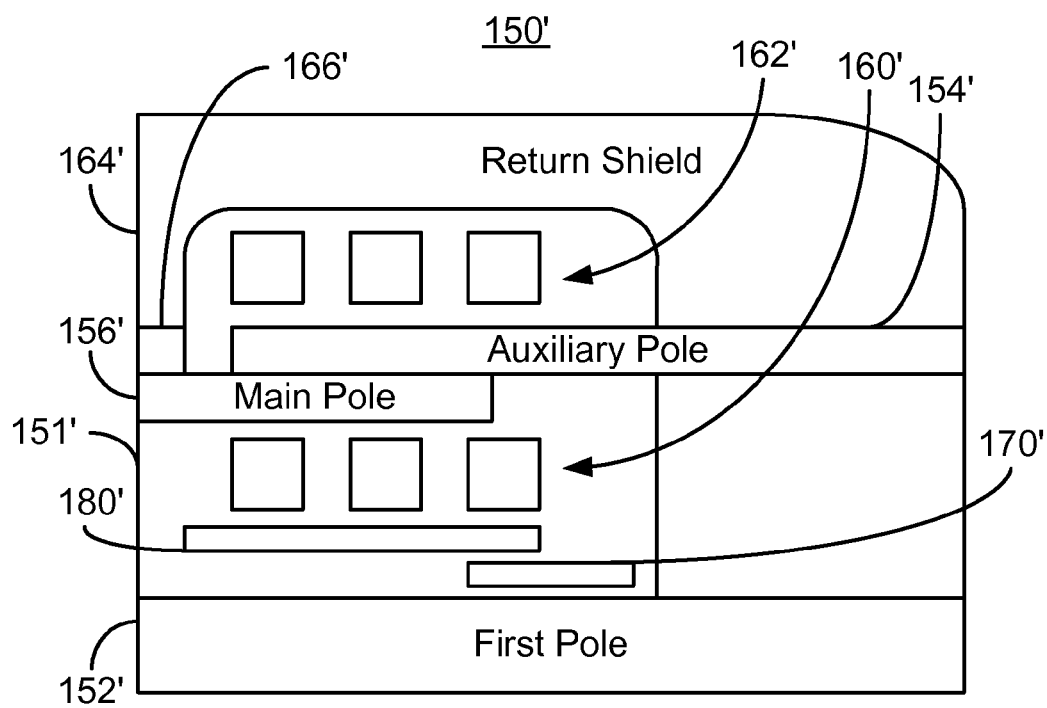
FIG. 6 depicts a side view of another exemplary embodiment of a write transducer including an expander.

FIG. 6 depicts a perspective view of an exemplary embodiment of a portion of the magnetic head 80. More specifically, a write transducer 150' is shown in FIG. 6. For simplicity, any other components of the head 80 are omitted and the media 60 is not shown in FIG. 6. For clarity, FIG. 6 is not drawn to scale. Referring to FIGS. 1 and 6, the write transducer 150' is also described in the context of particular components and layers. However, in some embodiments, such layers may include sub-layer(s). In addition, some components may be moved, omitted, or combined with other components. The transducer 150' is analogous to the transducer 150. Consequently, analogous components are labeled similarly. The transducer 150' thus includes a first pole 152', auxiliary pole 154', main pole 156', write gap 166', coils 160' and 162', return shield 164', heater 170' and expander 180' analogous to a first pole 152, auxiliary pole 154, main pole 156, write gap 166, coils 160 and 162, return shield 164, heater 170 and expander 180, respectively. The components 152', 154', 156', 166', 160', 162', 164', 170' and 180' thus have a similar structure and function to the components 152, 154, 156, 166, 160, 162, 164, 170 and 180, respectively. In the embodiment shown, the expander 180' overlaps the heater 170' in the down track direction. The heater 170' and expander 180' again reside in the insulator 151' that also adjoins the main pole 156'. However, in this embodiment, a portion of the expander 110" overlaps the heater 108" in both the track width direction (as seen from the ABS) and perpendicular to the ABS.

The heater 170' and expander 180' function in an analogous manner to the heater 170 and expander 180. Thus, a current is driven through the heater 170', which generates heat. The surrounding portions of the transducer 150' including the expander 180' experience an increase in temperature. Because it has a larger CTE, the expander 180' changes size to a greater extent than the insulator 151'. Further, the expander 180' may have a length perpendicular to the ABS that is greater than the remaining dimensions. Thus, the expander 180' tends to expand perpendicular to the ABS to a larger extent. The increase in thermal expansion, particularly coupled with the directionality of the thermal expansion, tends to cause the insulator 151', the pole 156', and other nearby components of the transducer 150' to protrude out toward the ABS.

Thus, the transducer 150' may share the benefits of the transducer 150. Because of the expander 180' the thermally induced protrusion of the write transducer 150' may be enhanced. The desired protrusion of the transducer 150' may thus be achieved at a lower temperature, a greater protrusion may be achieved at the same temperature, and/or the desired protrusion may be attained despite variations in fabrication of the transducer 150'.

Thus, the head 80 may include a read transducer and/or a write transducer. One or both of the read transducer and write transducer in the head 80 may include an expander. Thus, the benefits of the read transducer 100/100'/100" and/or the write transducer 150/150' may be achieved.

Figure 7:
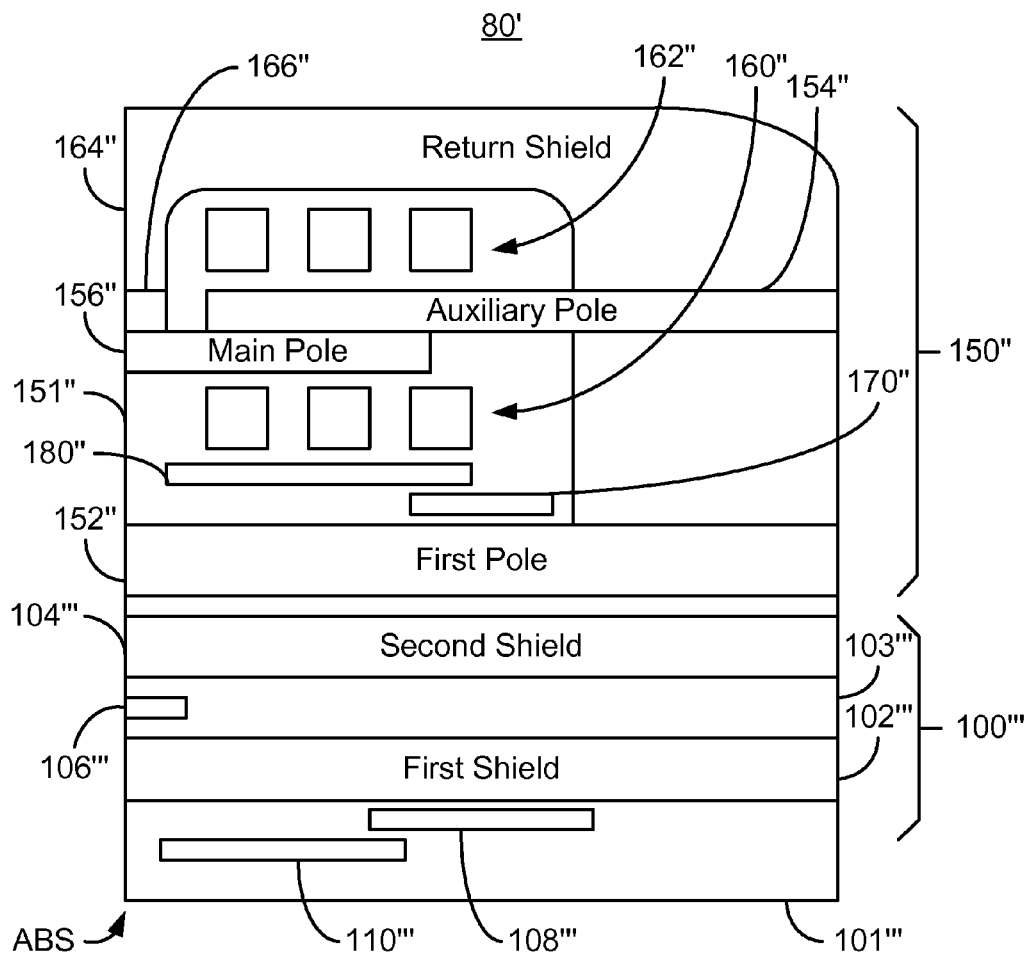
FIG. 7 depicts a side view of an exemplary embodiment of a head including a read transducer and a write transducer.

For example, FIG. 7 depicts a head 80' that includes a read transducer 100''' and a write transducer 150" that are analogous to the read transducer 100/100'/100" and write transducer 150/150', respectively. The transducer 100''' thus includes shields 102''' and 104''', insulators 101''' and 103''', read sensor 106''', heater 108''' and expander 110''' that are analogous to shields 102/102'/102" and 104/104'/104", insulators 101/101'/101" and 103/103'/103", read sensor 106/106'/106", heater 108/108'/108", and expander 110/110'/110", respectively. The components 101''', 102''', 103''', 104''', 106''', 108''', and 110''' thus have a similar structure and function to the components 101/101'/101", 102/102'/102", 103/103'/103", 104/104'/104", 106/106'/106", 108/108'/108", and 110/110'/110", respectively. Similarly, the transducer 150" includes a first pole 152", auxiliary pole 154", main pole 156", write gap 166", coils 160" and 162", return shield 164", heater 170" and expander 180" analogous to a first pole 152/152', auxiliary pole 154/154', main pole 156/156', write gap 166/166', coils 160/160' and 162/162', return shield 164/164', heater 170/170' and expander 180/180', respectively. The components 152", 154", 156", 166", 160", 162", 164", 170" and 180" thus have a similar structure and function to the components 152/152', 154/154', 156/156', 166/166, 160/160', 162/162', 164/164', 170/170' and 180/180', respectively.

The head 80' may thus share the benefits of both the read transducer 100/100'/100" and the write transducer 150/150'. Because of the expander 180" the thermally induced protrusion of the write transducer 150" may be enhanced. The desired protrusion of the transducer 150" may thus be achieved at a lower temperature, a greater protrusion may be achieved at the same temperature, and/or the desired protrusion may be attained despite variations in fabrication of the transducer 150". Similarly, because of the expander 110''', the thermally induced protrusion of the read transducer 100''' of the read transducer 100''' may be enhanced. The desired protrusion of the transducer 100''' may thus be achieved at a lower temperature, a greater protrusion may be achieved at the same temperature, and/or the desired protrusion may be attained despite variations in fabrication of the transducer 100". Further, the heater 108''' may be placed further from the read sensor 106''', reducing the probability the read sensor 106''' will be damaged by the heater 108'''.

Figure 8:
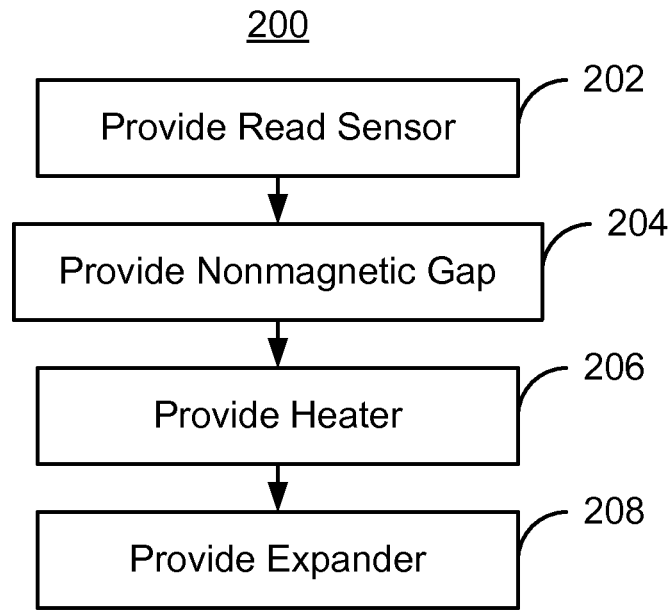
FIG. 8 is a flow chart depicting an exemplary embodiment of a method for fabricating a read transducer including an expander.

FIG. 8 depicts an exemplary embodiment of a method 200 for providing a read transducer that utilizes an expander. The method 200 is described in connection with the read transducer 100. However, the method 200 may be used in connection with read transducers 100', 100" and/or other analogous read transducers that use an expander such as the expander 110, 110', and 110". Further, although depicted as a flow of single steps, the steps of the method 200 may be performed in parallel and/or continuously. In addition, the steps of the method 200 may include substeps, may be combined, may be performed in another order and/or may be interleaved.

The read sensor 106 is provided, via step 202. Step 202 may include depositing the layers for the read sensor 106 and defining the read sensor. A nonmagnetic gap 103 may be provided, via step 204. Alternatively, the gap 101 may be provided. Thus, in some embodiments, the shield 102 may be provided between steps 202 and 204. The heater 108 is provided, via step 206. The expander 110 is also provided, via step 208. Note that steps 204, 206, and 208 may be performed before step 202 for the transducer 100, but after step 202 for the transducer 100'. Fabrication of the transducer 100 may then be completed. Thus, the benefits of the transducer 100, 100', 100'', and/or 100''' may be achieved.

Figure 9:
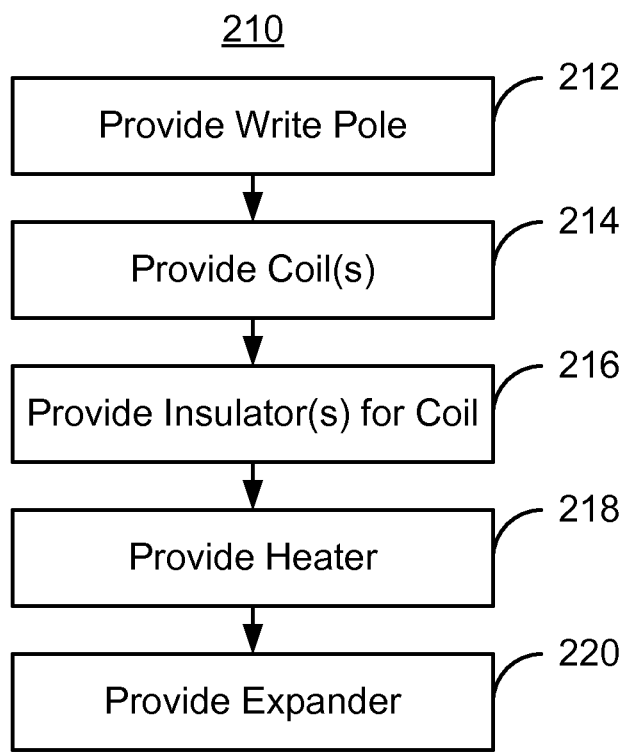
FIG. 9 is a flow chart depicting an exemplary embodiment of a method for fabricating a write transducer including an expander.

FIG. 9 depicts an exemplary embodiment of a method 210 for providing a write transducer that utilizes an expander. The method 210 is described in connection with the write transducer 150. However, the method 210 may be used in connection with read transducers 150' and/or other analogous read transducers that use an expander such as the expander 180 and 180'. Further, although depicted as a flow of single steps, the steps of the method 210 may be performed in parallel and/or continuously. In addition, the steps of the method 210 may include substeps, may be combined, may be performed in another order and/or may be interleaved.

The main pole 156 is provided, via step 212. Step 202 may include a number of patterning, deposition, and removal steps. The coil(s) 160 and 170 may then be provided, via step 214. An insulator 151 may then be provided to insulate the turns of the coil 160, via step 216. The heater 180 is provided, via step 218. The expander 180 is also provided, via step 220. Fabrication of the transducer 150 may then be completed. Thus, the benefits of the transducer 150 and/or 150''' may be achieved.

We claim:

1. A magnetic write transducer having an air-bearing surface (ABS) comprising:
   a write pole;
   at least one coil for energizing the write pole;
   a heater for heating a portion of the magnetic read transducer;
   an insulator adjacent to a portion of the coil, the insulator having a first coefficient of thermal expansion (CTE);
   and an expander the expander having a second CTE greater than the first CTE.

2. The magnetic write transducer of claim 1 wherein at least a portion of the expander is between the heater and the ABS.

3. The magnetic write transducer of claim 1 wherein the second CTE is at least twice the first CTE.

4. The magnetic write transducer of claim 1 wherein the expander has a length perpendicular to the ABS and a width in a track width direction, the length being at least twice the width.

5. The magnetic write transducer of claim 4 wherein the length is at least five times the width.

6. The magnetic write transducer of claim 4 wherein the heater has an active region having an active region width in the track width direction, the width being substantially equal to the active region width.

7. The magnetic write transducer of claim 1 wherein an additional portion of the expander overlaps the heater in a direction perpendicular to the ABS.

8. The magnetic write transducer of claim 1 wherein the expander includes a metal.

9. The magnetic write transducer of claim 1 wherein a portion of the at least one coil resides between the expander and the ABS.

10. A magnetic recording head having an air-bearing surface (ABS) comprising:
    a magnetic read transducer including a read sensor, and a nonmagnetic gap; and
    a magnetic write transducer including a write pole, at least one coil for energizing the write pole, and an insulator adjacent to a portion of the coil;
    wherein at least one of the magnetic read transducer and the magnetic write transducer including a heater, a portion of the magnetic head adjacent to the expander having a first coefficient of thermal expansion (CTE) greater than a second CTE of the expander.

11. The magnetic head of claim 10 wherein at least a portion of the expander is between the heater and the ABS.

12. The magnetic recording head of claim 10 wherein the magnetic read transducer includes a reader expander and a reader heater for heating a portion of the magnetic read transducer, at least a portion of the reader expander residing between the reader heater and the ABS, the nonmagnetic gap having a third CTE, the reader expander having a fourth CTE greater than the third CTE and wherein the magnetic write transducer includes a writer expander and a writer heater for heating a portion of the magnetic write transducer, the insulator having a fifth CTE, at least a portion of the writer expander residing between the writer heater and the ABS, the writer expander having a sixth CTE greater than the fifth CTE.

13. A disk drive comprising:
    a slider;
    media; and
    a magnetic recording head coupled to the slider and including a magnetic read transducer and a magnetic write transducer, the magnetic read transducer including a read sensor, and a nonmagnetic gap, the magnetic write transducer including a write pole, at least one coil for energizing the write pole, and an insulator, the insulator being adjacent to a portion of the coil;
    wherein at least one of the magnetic read transducer and the magnetic write transducer including a heater and an expander residing between the heater and the ABS, a portion of the magnetic head adjacent to the expander having a first coefficient of thermal expansion (CTE) greater than a second CTE of the expander.

14. The disk drive of claim 13 wherein at least a portion of the expander is between the heater and the ABS.

15. The disk drive of claim 13 wherein the magnetic read transducer includes a reader expander and a reader heater for heating a portion of the magnetic read transducer, at least a portion of the reader expander residing between the reader heater and the ABS, the nonmagnetic gap having a third CTE, the reader expander having a fourth CTE greater than the third CTE and wherein the magnetic write transducer includes a writer expander and a writer heater for heating a portion of the magnetic write transducer, the insulator having a fifth CTE, at least a portion of the writer expander residing between the writer heater and the ABS, the writer expander having a sixth CTE greater than the fifth CTE.

* * * * *